United States Patent
Keoshkerian

(10) Patent No.: US 7,009,011 B1
(45) Date of Patent: Mar. 7, 2006

(54) COPOLYMERS OF MALEIC ANHYDRIDE BY STABLE FREE REDICAL POLYMERIZATION

(75) Inventor: Barkev Keoshkerian, Thornhill (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/139,543

(22) Filed: May 31, 2005

(51) Int. Cl.
*C08F 222/06* (2006.01)

(52) U.S. Cl. .................... 526/86; 526/204; 526/219.2; 526/229; 526/229.5; 526/230.5; 526/262; 526/271; 526/272; 525/256

(58) Field of Classification Search ................. 526/86, 526/204, 219.2, 271, 262, 272, 229.5, 229, 526/230.5; 525/256
See application file for complete search history.

(56) References Cited

U.S. PATENT DOCUMENTS

| 3,755,264 A | * | 8/1973 | Testa ...................... 525/327.8 |
| 4,551,511 A | * | 11/1985 | Goel ........................ 526/204 |
| 5,322,912 A | | 6/1994 | Georges et al. |
| 5,449,724 A | | 9/1995 | Moffat et al. |
| 6,087,451 A | | 7/2000 | Georges et al. |
| 6,156,858 A | | 12/2000 | Keoshkerian et al. |
| 2002/0061989 A1 | * | 5/2002 | Anderson et al. ........... 526/204 |

* cited by examiner

*Primary Examiner*—Fred Teskin
(74) *Attorney, Agent, or Firm*—Oliff & Berridge, PLC

(57) ABSTRACT

A stable free radical process for preparing a polymer having acid anhydride functionality includes heating a mixture comprised of a stable free radical agent, maleic anhydride or derivative thereof, and at least one polymerizable electron donor monomer to initiate exothermic reaction and during exotherm of the reaction, adding additional amounts of stable free radical agent to control the reaction temperature. The mixture may also include a stable free radical initiator. In the mixture, the maleic anhydride or derivative thereof preferably comprises from about 10% to about 70%, molar basis, of a total amount of the maleic anhydride or derivative thereof and the at least one polymerizable electron donor monomer. Typically, the heating is to a temperature of from about 100° C. to about 160° C., and the rate of addition of the additional amounts of stable free radical agent is adjusted to control the reaction temperature to be about 160° C. or less.

22 Claims, No Drawings

COPOLYMERS OF MALEIC ANHYDRIDE BY STABLE FREE REDICAL POLYMERIZATION

BACKGROUND

Described are copolymers having a high content of acid anhydride functional groups in the polymeric chain, and a stable free radical polymerization process for making such copolymers.

U.S. Pat. No. 5,322,912, incorporated herein by reference in its entirety, describes a free radical polymerization process for the preparation of a thermoplastic resin or resins comprising heating a mixture of a free radical initiator, a stable free radical agent, and at least one polymerizable monomer compound to form a thermoplastic resin or resins with a high monomer to polymer conversion; cooling the mixture; optionally isolating the thermoplastic resin or resins; and optionally washing and drying the thermoplastic resin or resins. Related free radical processes are also disclosed for the preparation of mixtures and block copolymer thermoplastic resins. Resins prepared by the disclosed processes possess a narrow polydispersity and a modality that is controlled by the selection of a free radical initiator and stable free radical agent addition step or steps.

U.S. Pat. No. 5,449,724, incorporated herein by reference in its entirety, describes a free radical polymerization process for the preparation of a thermoplastic resin that includes heating a mixture comprised of a free radical initiator, a stable free radical agent, and ethylene at a temperature of from about 40° C. to about 500° C. and at a pressure of from about 500 to about 5,000 bar to form a thermoplastic resin. The thermoplastic resin has a molecular weight distribution of from about 1.0 to about 2.0.

U.S. Pat. No. 6,087,451, incorporated herein by reference in its entirety, describes a polymer having groups located at the ends of the polymer chain, which groups are derived from stable free radical compounds. The polymer is of the formula SFR—(R)—SFR, wherein SFR represents a covalently bonded stable free radical group and R represents a thermoplastic resin.

U.S. Pat. No. 6,156,858, incorporated herein by reference in its entirety, describes a process for the preparation of polymer comprising heating a mixture comprised of a free radical initiator, a stable free radical agent, a base selected from the group consisting of inorganic bases and organic bases, and at least one polymerizable monomer compound and optionally cooling, followed by optionally isolating the polymer product.

Copolymers having acid anhydride functionality can be used in a number of ways. For example, the acid anhydride functionality can be used as a grafting site for polymer modification. The acid anhydride functionality can also be used as a carboxylic (COOH) acid site if hydrolyzed. In a toner binder resin, the acid anhydride functionality may be used as an aggregation/coalescence site permitting larger size toner particles to be grown from latex particles.

In forming a copolymer from maleic anhydride (MA) or derivatives thereof, a preferred method is to copolymerize the anhydride with electron donor monomers via stable free radical polymerization. Maleic anhydride will polymerize with other monomers in an alternating fashion due to the charge transfer complex that MA forms with electron donor monomers. Stable free radical polymerization permits the anhydride to be introduced as an alternating unit with the electron donor as a pure block when the electron donor is present in molar excess to MA. In conventional polymerization processes, all the MA polymerizes with the electron donor monomer first and subsequently the remainder of the electron donor monomer may be used up via reaction with itself, and thus a significant amount of polymer may be derived that has no anhydride functionality. Stable free radical polymerization is thus preferred in achieving a more uniform product that is substantially free of polymers lacking acid anhydride functionality. In addition, stable free radical polymerization can be used to produce a block copolymer with alternating units that include the anhydride group, which anhydride blocks can be used in preparing further block copolymers with additional polymerizable compounds that may otherwise be incompatible with the donor material.

Currently, however, stable free radical polymerization can be used to make copolymers of only very low maleic anhydride content of, for example, less than 5% by mole of total materials. This is because at the high temperature conditions, e.g., 100° C. to 160° C., of stable free radical polymerization, maleic anhydride and the donor material thermally initiate to cause massive exotherms of greater than 100° C. in a few seconds. That is, bulk or neat free radical polymerization processes of the prior art are prone to generating excessive quantities of heat since the polymerization reaction is exothermic, and as the viscosity of the reaction medium increases, dissipation of heat becomes more difficult. This is referred to as the Trommsdorff effect as discussed and illustrated in Principles of Polymerization, G. Odian, 2nd Ed., Wiley-Interscience, N.Y., 1981, page 272, the disclosure of which is entirely incorporated herein by reference. This exothermic nature of free radical polymerization processes severely restricts the concentration of reactants or the reactor size upon scale up. In other words, it is currently necessary to restrict the amount of anhydride providing material in the polymerization process in order to avoid dangerous and explosive overheating of the reaction, which restriction is typically achieved by dilution with solvents (expensive) or by limiting the amount of MA in a bulk polymerization of electron donor monomer (limiting the anhydride content in the final polymer).

What is still desired is a stable free radical polymerization process that is safe and effective for forming polymers in a bulk process or without solvents that include a greater degree of acid anhydride functionality therein.

SUMMARY

In a first embodiment, described is a process for preparing a polymer comprising heating a mixture comprised of a free radical initiator, a stable free radical agent, maleic anhydride or derivative thereof, and at least one polymerizable electron donor monomer to initiate polymerization, and, during exotherm of the reaction, adding additional amounts of stable free radical agent to control the reaction temperature.

In a further embodiment, described is a process for preparing a polymer comprising heating a mixture comprised of a free radical initiator, a stable free radical agent, maleic anhydride or derivative thereof, and at least one polymerizable donor monomer to about 100° C. to about 160° C., and when or after thermal initiation of the reaction starts, adding additional amounts of stable free radical agent to control the reaction temperature to about 160° C. or less, wherein the addition of the additional amounts of stable free radical agent continues until exotherm of the reaction is completed.

In a still further embodiment, described is a process for preparing a polymer comprising heating a mixture comprised of a stable free radical agent, maleic anhydride or derivative thereof, and at least one polymerizable donor monomer to initiate exothermic reaction, and during exotherm of the reaction, adding additional amounts of stable free radical agent to control the reaction temperature.

DETAILED DESCRIPTION OF EMBODIMENTS

In the stable free radical polymerization process, the maleic anhydride or derivative thereof is mixed with the at least one polymerizable electron donor monomer. These materials will be reacted in the stable free polymerization reaction in order to form the intended polymer having acid anhydride functionality.

The maleic anhydride provides the acid anhydride functionality to the polymer chain. Suitable derivatives of maleic anhydride may also be used. Thus, by maleic anhydride as used herein is intended all maleic anhydride forms and derivatives thereof. Beside maleic anhydride itself, other maleic anhydride compounds that may be used include, but are not limited to, 2,3-substituted maleic anhydrides. Maleic anhydride derivatives must form charge transfer complexes with the electron donor monomer(s), and thus be able to form the polymer chain in a stable free radical polymerization process. Example derivatives of maleic anhydride that may be used include, but are not limited to, maleimide, including N-Alkyl or N-phenyl maleimide.

As the at least one electron donor monomer that can form a charge transfer complex with the maleic anhydride or derivative thereof may be used without limitation. The electron donor monomer preferably includes ethylenic unsaturation, for example, at least one carbon—carbon double bond. Thus, preferred electron donor monomers are ethylenically unsaturated compounds.

As example electron donor monomers, mention may be made of styrene, substituted styrenes and derivatives thereof, for example, hydroxylated, sulfonated, and methylated styrenes; olefins such as ethylene, propylene, 1-butene, isobutylene, cis-butene-2, trans-butene-2; conjugated dienes, including examples such as butadiene and isoprene; vinyl compounds such as vinyl acetals, vinyl esters, vinyl ketones methyl vinyl ether, dodecyl vinyl ether; acrylates such as alkyl acrylates with esters having from 1 to 20 carbon atoms, e.g., n-butyl acrylate, methacrylates, e.g., methyl methacrylate; and halogenated compounds such as allyl chloride and vinyl chloride. In a preferred embodiment, the donor monomer is styrene.

In the reaction mixture, the maleic anhydride or derivative thereof is preferably present in an amount, on a molar basis, from about 10% to about 70%, preferably from about 10% to about 55%, of the total amount of the maleic anhydride or derivative thereof and the electron donor monomer(s) present in the mixture. Of course, the stable free radical process may be practiced with lesser or greater amounts of maleic anhydride if desired. If lesser amounts of maleic anhydride or derivative thereof are used, the reaction temperature control process step of the process may not be needed. If greater amounts of maleic anhydride or derivative thereof are used, the reaction may conclude with excess maleic anhydride or derivative in the reaction mixture.

It is also preferable to include in the reaction mixture a stable free radical agent. Examples of stable free radical agents include nitroxide free radicals like, for example, PROXYL (2,2,5,5-tetramethyl-1-pyrrolidinyloxy), 3-carboxyl-PROXYL, 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3-maleimidoPROXYL, 3,4-di-t-butyl-PROXYL, 3-carboxylic-2,2,5,5-tetramethyl-1-pyrrolidinyloxy and the like, and derivatives thereof, and TEMPO (2,2,6,6-tetramethyl-1-piperidinyloxy) and derivatives thereof, including 4-benzoxyloxy-TEMPO, 4-methoxy-TEMPO, 4-carboxylic-4-amino-TEMPO, 4-chloro-TEMPO, 4-hydroxylimine-TEMPO, 4-hydroxy-TEMPO (2,2,6,6-tetramethyl-4-hydroxy-1-piperidinyloxy, referred to herein as "HOTEMPO"), 4-oxo-TEMPO, 4-oxo-TEMPO-ethylene ketal, and 4-amino-TEMPO, 2,2,6,6-tetraethyl-1-piperidinyloxy, 2,2,6-trimethyl-6-ethyl-1-piperidinyloxy and the like, and derivatives thereof, and dialkyl nitroxide radicals such as di-t-butyl nitroxide, diphenyl nitroxide, t-butyl-t-amyl nitroxide and the like, and derivatives thereof, and DOXYL (4,4-dimethyl-1-oxazolidinyloxy), 2-di-t-butyl-DOXYL, 5-decane-DOXYL, 2-cyclohexane-DOXYL, and the like, and derivatives thereof, and 2,5-dimethyl-3,4-dicarboxylic-pyrrole, 2,5-dimethyl-3,4-diethylester-pyrrole, 2,3,4,5-tetraphenyl-pyrrole and the like, and 3-cyano-pyrroline-3-carbamoyl-pyrroline, 3-carboxylic-pyrroline, and the like; 1,1,3,3-tetramethylisoindolin-2-yloxyl and 1,1,3,3-tetraethylisoindolin-2-yloxyl and the like; porphyrexide nitroxyl radicals, such as 5-cyclohexyl porphyrexide nitroxyl and the like, and galvinoxyl and the like; 1,3,3-trimethyl-2-azabicyclo[2,2,2]octane-5-one-2-oxide and 1-azabicyclo[3,3, I]nonane-2-oxide and the like. Preferably, the stable free radical agent is PROXYL (2,2,5,5-tetramethyl-1-pyrrolidinyloxy) and derivatives thereof, TEMPO (2,2,6,6-tetramethyl- 1-piperidinyloxy) and derivatives thereof, 4,4-dimethyl-1-oxazolidinyloxy, and the like. These stable free radical agent materials are well known in the literature, for example G. Moad et.al., Tetrahedron Letters, 22, 1165 (1981) as free radical polymerization inhibitors. Under the polymerization conditions of the instant process, the stable free radical agents function as moderators to harness the normally highly reactive and indiscriminate intermediate free radical species.

On a molar basis, the stable free radical agent is preferably used in a ratio of agent to polymerizable compounds of from about 0.00001:1 to about 0.004:1.

Optionally, the reaction mixture may also include a stable free radical initiator, preferably a thermal initiator. Although it is possible for the reaction to proceed in the absence of such an initiator, inclusion of the initiator may achieve better control of the properties, for example molecular weight and polydispersity, of the polymer achieved.

As the stable free radical initiator, any free radical polymerization initiator capable of initiating a free radical polymerization process may be used without limitation. Suitable initiators include any conventional free radical initiators that have a half-life of at least 1 second at the polymerization temperature. Preferably, the initiator will have a half-life of from about 10 second to about 2 hours, more preferably from about 10 seconds to about 10 minutes, at the reaction temperature. Example initiators include, but are not limited to, oxygen, organic peroxides such as hydrogen peroxide, certain alkyl hydroperoxides, dialkyl peroxides, peracids, peresters, percarbonates, peroxides, persulfates, and azo initiators such as azobisalkylnitriles, e.g., azobisisobutyronitrile. Specific examples of some suitable initiators include hydrogen peroxide, benzoyl peroxide, t-butyl hydroperoxide, di-tertiary butyl peroxide, tertiary-amyl hydroperoxide, potassium persulfate, and methylethyl ketone peroxide.

The initiator concentration employed can be any effective suitable amount, and is, for example, from about 0.05 to about 30 weight percent of the total weight of the polymerizable compounds to be polymerized and which concentration is determined by the desired molecular weight of the resin. On a molar basis, the initiator is preferably used in a ratio of initiator to polymerizable compounds of from about 0.00001:1 to about 0.001:1. As the initiator concentration is decreased relative to the weight of molar equivalents of polymerizable compounds used, the molecular weight of the polymer product increases. This free radical initiator can be added as a separate component to the reaction mixture, and is not reacted with the stable free radical agent prior to use thereof in embodiments.

When an initiator is present, the molar ratio of the stable free radical agent used in the process to free radical initiator is preferably from about 0.5:1 to about 20:1, preferably about 0.5:1 to about 5:1, and most preferably at about 2:1. If the stable free radical amount is too high, then the reaction rate is noticeably inhibited. If the stable free radical amount is too low, then the reaction product has undesired increased polydispersity.

The stable free radical agent moderated polymerization reactions may be performed in a variety of media, for example, suspension, emulsion, bulk, that is neat or without solvent, or in aqueous or nonaqueous solution, using preferably higher boiling solvents such as toluene and xylene. Preferably, the reaction mixture is neat.

The stable free radical polymerization process is effected by heating the reaction mixture. Preferably, the reaction mixture is heated to a temperature of about 100° C. to about 160° C., preferably between about 120° C. to 140° C. Reactions performed above 160° C. may be conducted, but such tend to result in a broadening of the polydispersity of the resulting polymer.

As was discussed above, the reaction of the maleic anhydride or derivative with the polymerizable donor monomers is exothermic. Upon thermal initiation of the reaction, which occurs in the temperature range of about 100° C. to about 160° C., large amounts of heat are generated in a short time. The point of thermal initiation varies depending upon the content of reactants, reactant volume and the type of initiator used, if any.

To control the reaction temperature, and to prevent potentially explosive heating as a result of the exotherm, the process herein includes the addition of additional amounts of stable free radical agent during the exotherm. The addition of the additional stable free radical agent may begin at any time following the start of heating. It is only necessary to include at least a portion of the addition during the exotherm of the reaction in order to suitably control the reaction temperature. Preferably, the addition is started when or just prior to the time when thermal initiation of the reaction starts. The start of thermal initiation may be readily detected in any manner, for example through the use of thermometers or sensors detecting a rise in reaction temperature beyond that attributable to an external heat source.

The addition may be effected in any suitable manner. In a preferred embodiment, the addition is done via drop wise addition of the additional stable free radical agent. The additional stable free radical agent is preferably added continuously throughout the addition step, rather than intermittently, in order to control the reaction temperature to be stable during the reaction. The rate of addition may be varied as needed, however, so long as the rate of addition is sufficient to maintain the reaction temperature below a target temperature. For example, in preferred embodiments, the reaction temperature should be controlled via addition of the additional stable free radical agent such that the temperature does not exceed about 160° C., preferably about 130° C.

The additional stable free radical agent may be any of the stable free radical agents listed above. The additional stable free radical agent added may be the same or different from the stable free radical agent initially present in the reaction mixture. Preferably, the additional stable free radical agent added is the same as the agent initially present in the reaction mixture.

While the stable free radical agent may be added alone or in a solvent of the system, it is preferable to first mix the additional agent with additional reactive compounds of the system for addition. In a preferred embodiment, the additional stable free radical agent is mixed with an additional amount of the polymerizable electron donor monomer. The minimal amount of monomer to dissolve the agent may be, for example, at least about 1 ml monomer per gram of agent. For TEMPO, the minimal amount of monomer may be at least about 20 ml of monomer per gram of TEMPO. The total amount of additional monomer to be added may comprise from about 1 to about 20%, preferably no more than about 10%, by weight of the total monomer in the system. Preferably, the total amount of agent total in the system, initially present and added, is made to be from about 2% to about 30% (mol/mol) of the anhydride amount.

The addition of the additional amount of stable free radical agent preferably continues until the exotherm has completed.

The total reaction time may be from about 0.5 to about 60 hours, preferably between about 0.5 to 10 hours.

Following completion of the reaction exotherm, the polymer produced may be cooled and isolated by precipitation with a nonsolvent such as hexane and the like. Alternatively, a further reactive polymerizable compound may be added to the reaction medium in order to react with the polymer containing acid anhydride functionality, thereby forming a block copolymer. Because of the reactivity of the acid anhydride functionality, the additional polymerizable compound that may be added to form a block copolymer is not particularly limited.

The polymer derived in the process preferably possesses a narrow polydispersity (Mw/Mn) of about 1.0 to about 2.0, preferably about 1.0 to about 1.5, and has a weight average molecular weight (Mw) of from about 1,000 to about 200,000 and a number average molecular weight (Mn) of from about 500 to about 100,000.

Although not to be limited by theory, it is believed that in the stable free radical polymerization process, the polymer chains are expected to be initiated at about the same time. This is a reason for being able to achieve polymer chain products having narrow polydispersities. Undesirable chain coupling or disproportionation termination reactions are suppressed because the effective concentration and availability of living free chains is extremely small. In addition, the stable free radical agents do not initiate polymerization so that new chains are not initiated after an initial period during which all polymer chains are initiated at about the same time. Propagating chains herein are referred to as pseudoliving because the stable free radical agent adds to a propagating chain and the chain is temporarily, but reversibly, terminated. The propagating polymer chain fluctuates or is in an equilibrium condition between being temporarily terminated or suspended and being alive or living. As thermal energy is supplied from the reaction system to the bond joining the growing polymeric chain and the stable free radical agent, that is, the adduct where, for example, the stable free radical agent covalently bound to the propagating chain, for example, styrene, homolytically cleaves, thereby temporarily generating a living chain end radical species and permitting another monomer unit to insert or add to the chain. The chain is again instantaneously, albeit short lived as determined by diffusion control, terminated or protected by the stable free radical agent as a thermally labile adduct. The term "protected" as used herein is meant to suggest that the chain radical species is available for selective rather than indiscriminant further reaction with reactive compounds. An unmoderated free radical polymerization chain, that is, a free radical polymerization process without a stable free radical agent present, in contrast has a reactive or "open" chain end throughout the reaction.

Processes, in embodiments, provide for high monomer to polymer conversion rates, or degrees of polymerization, for example of 90 percent by weight or greater.

The processes will be further illustrated by way of the following illustrative examples.

EXAMPLE 1

This example illustrates preparation of poly(styrene-maleic anhydride).

To a 500 ml round bottom flask was discharged styrene (250 ml), maleic anhydride (50 g) and TEMPO (1.6 g, 0.0103 moles). In a dropping funnel was added styrene (58 ml) and TEMPO (8.46 g, 0.0542 moles). Both solutions were deoxygenated by bubbling argon therethrough while the round bottom flask was heated in an oil bath set at 135° C. When the reaction approached 105° C., an exotherm was noted and the second solution was added drop wise to maintain a reaction temperature of 129° C. After heating for 25 minutes, the reaction temperature started to fall, and the solution was cooled. Tetrahydrofuran (400 ml) was added, and the solution was precipitated from hexane (4 l) to afford a solid. 125.3 g of poly(styrene-maleic anhydride) was achieved having a Mn of 5,273 and a polydispersity of 1.63.

EXAMPLE 2

This example illustrates preparation of poly(styrene-maleic anhydride).

To a 1000 ml round bottom flask was discharged styrene (425 ml), maleic anhydride (100.2 g) and TEMPO (3.2 g, 0.0205 moles). In a dropping funnel was added styrene (72 ml) and TEMPO (12.2 g, 0.0782 moles). Both solutions were deoxygenated by bubbling argon therethrough while the round bottom flask was heated in an oil bath set at 135° C. When the reaction approached 105° C., an exotherm was noted and the second solution was added drop wise to maintain a reaction temperature of 130° C. After heating for 45 minutes, the reaction temperature started to fall, and the solution was cooled. Tetrahydrofuran (500 ml) was added, and the solution was precipitated from hexane (3 l) to afford a solid. 125.3 g of poly(styrene-maleic anhydride) was achieved having a Mn of 3,523 and a polydispersity of 1.48.

EXAMPLE 3

This example illustrates preparation of a block copolymer of poly(styrene-maleic anhydride-b-styrene/acrylonitrile).

The poly(styrene-maleic anhydride) of Example 2 was dissolved in styrene/acrylonitrile monomer (118 ml styrene to 47 ml acrylonitrile) and heated under a nitrogen atmosphere to 135° C. After 100 minutes, the reaction was cooled. Analysis of the copolymer by gel permeation chromatography showed that the initial polymer grew to a final Mn of 62,000 with a polydispersity of 1.41.

EXAMPLE 4

To a 1000 ml round bottom flask was discharged styrene and butylacrylate (250 ml of a 78:22 ratio, v/v), maleic anhydride (61.3 g), azoisobutyronitrile (AIBN, 2.12 g) and HOTEMPO (4.47 g, 0.0258 moles). In a dropping funnel was added styrene/butytacrylate (150 ml of a 78/22 v/v ratio) and HOTEMPO (21.75 g, 0.126 moles). Both solutions were deoxygenated by bubbling argon through while the round bottom flask was heated in an oil bath set at 135° C. When the reaction approached 105° C., an exotherm was noted and the second solution was added drop wise to maintain a reaction temperature of 130° C. After heating for 35 minutes, the reaction temperature started to fall, and the solution was cooled. Tetrahydrofuran (200 ml) was added, and the solution was precipitated from hexane (4 l) to afford a solid. 155.5 g of poly(styrene-maleic anhydride) was achieved having a Mn of 6,311 and a polydispersity of 1.69

EXAMPLE 5

To a 1000 ml round bottom flask was discharged styrene and butylacrylate (250 ml of a 78:22 ratio, v/v), maleic anhydride (61.3 g), azoisobutyronitrile (AIBN, 4.23 g) and HOTEMPO (8.88 g, 0.0516 moles). In a dropping funnel was added styrene/butylacrylate (150 ml of a 78/22 v/v ratio) and HOTEMPO (21.75 g, 0.126 moles), solution B. Both solutions were deoxygenated by bubbling argon through while the round bottom flask was heated in an oil bath set at 135° C. When the reaction approached 105° C., an exotherm was noted and the second solution was added drop wise to maintain a reaction temperature of 130° C. After heating for 40 minutes, the reaction temperature started to fall, and the solution was cooled. A total of 42.4 g of solution B was added (5.96 g of HOTEMPO). Tetrahydrofuran (300 ml) was added, and the solution was precipitated from hexane (4 l) solid. 130.4 g of poly(styrene-maleic anhydride) was achieved having a Mn of 2,502 and a polydispersity of 1.67.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A process for preparing a polymer comprising
heating a mixture comprised of a free radical initiator, a stable free radical agent, maleic anhydride or derivative thereof, and at least one polymerizable electron donor monomer to initiate exothermic reaction, and
during exotherm of the reaction, adding additional amounts of stable free radical agent to control the reaction temperature.

2. The process according to claim 1, wherein on a molar basis, the maleic anhydride or derivative thereof comprises from about 10% to about 70% of a total amount of the maleic anhydride or derivative thereof and the at least one polymerizable electron donor monomer in the mixture.

3. The process according to claim 1, wherein the heating heats the mixture to a temperature of from about 100° C. to about 160° C.

4. The process according to claim 1, wherein the adding of additional amounts of stable free radical agent is continuous.

5. The process according to claim 1, wherein a rate of addition of the additional amounts of stable free radical agent is adjusted to control the reaction temperature to about 160° C. or less.

6. The process according to claim 1, wherein the stable free radical initiator is selected from the group consisting of organic peroxides, azobisalkylnitriles, oxygen, peracids, peresters, percarbonates, persulfates, azo initiators and mixtures thereof.

7. The process according to claim 1, wherein the stable free radical agent is a nitroxide stable free radical.

8. The process according to claim 7, wherein the nitroxide stable free radical is selected from the group consisting of 2,2,5,5-tetramethyl-1-pyrrolidinyloxy, 2,2,6,6-tetramethyl-1-piperidinyloxy and derivatives thereof, 4,4-dimethyl-1-oxazolidinyloxy, and mixtures thereof.

9. The process according to claim 1, wherein the at least one polymerizable electron donor monomer is an ethylenically unsaturated hydrocarbon.

10. The process according to claim 1, wherein the at least one polymerizable electron donor monomer is selected from the group consisting of styrene, ethylene, propylene, 1-butene, isobutylene, cis-butene-2, trans-butene-2, methyl vinyl ether, dodecyl vinyl ether, acrylates, methacrylate, allyl chloride, vinyl chloride, acrylonitrile and mixtures thereof.

11. The process according to claim 1, wherein the at least one polymerizable electron donor monomer is styrene.

12. The process according to claim 1, wherein the stable free radical agent to free radical initiator molar ratio is from about 0.5:1 to about 20:1.

13. A process for preparing a polymer comprising heating a mixture comprised of a free radical initiator, a stable free radical agent, maleic anhydride or derivative thereof, and at least one polymerizable electron donor monomer to about 100° C. to about 160° C., and when or prior to thermal initiation of the reaction starts, adding additional amounts of stable free radical agent to control the reaction temperature to about 160° C. or less, wherein the addition of the additional amounts of stable free radical agent continues at least until exotherm of the reaction is completed.

14. The process according to claim 13, wherein on a molar basis, the maleic anhydride or derivative thereof comprises from about 10% to about 70% of a total amount of the maleic anhydride or derivative thereof and the at least one polymerizable electron donor monomer in the mixture.

15. The process according to claim 13, wherein the addition of additional amounts of stable free radical agent is continuous.

16. The process according to claim 13, wherein a rate of addition of the additional amounts of stable free radical agent is adjusted to control the reaction temperature to about 160° C. or less.

17. The process according to claim 13, wherein the stable free radical initiator is selected from the group consisting of organic peroxides, azobisalkylnitriles, oxygen, peracids, peresters, percarbonates, persulfates, azo initiators and mixtures thereof.

18. The process according to claim 13, wherein the stable free radical agent is a nitroxide stable free radical.

19. The process according to claim 17, wherein the nitroxide stable free radical is selected from the group consisting of 2,2,5,5-tetramethyl-1-pyrrolidinyloxy, 2,2,6,6-tetramethyl-1-piperidinyloxy and derivatives thereof, 4,4-dimethyl-1-oxazolidinyloxy, and mixtures thereof.

20. The process according claim 13, wherein the at least one polymerizable electron donor monomer is an ethylenically unsaturated hydrocarbon.

21. The process according to claim 13, wherein the at least one polymerizable electron donor monomer is styrene.

22. A process for preparing a polymer comprising heating a mixture comprised of a stable free radical agent, maleic anhydride or derivative thereof, and at least one polymerizable electron donor monomer to initiate exothermic reaction, wherein on a molar basis, the maleic anhydride or derivative thereof comprises from about 10% to about 70% of a total amount of the maleic anhydride or derivative thereof and the at least one polymerizable electron donor monomer in the mixture, and during exotherm of the reaction, adding additional amounts of stable free radical agent to control the reaction temperature.

* * * * *